United States Patent [19]
Choi

[11] Patent Number: 5,297,827
[45] Date of Patent: Mar. 29, 1994

[54] METAL PIPE COUPLING

[76] Inventor: Jeong-Yoon Choi, No. Na-305 Yeonhi Villa, 1128-28 Whakok-dong, Kangeso-gu, Seoul 157-010, Rep. of Korea

[21] Appl. No.: 8,224

[22] Filed: Jan. 22, 1993

Related U.S. Application Data

[63] Continuation-in-part of Ser. No. 777,126, Oct. 16, 1991, abandoned.

[51] Int. Cl.$^5$ ............................................. F16L 17/00
[52] U.S. Cl. ..................................... 285/351; 285/369; 285/382 A; 29/523
[58] Field of Search ............... 285/382.4, 382.5, 351, 285/369; 24/507, 523

[56]  References Cited

U.S. PATENT DOCUMENTS

| | | | |
|---|---|---|---|
| 178,313 | 6/1876 | Leland | 285/362.4 X |
| 1,953,665 | 4/1934 | Wallace | 285/362.4 |
| 4,330,144 | 5/1982 | Ridenour | 285/382.5 |
| 4,844,517 | 7/1989 | Beiley et al. | 285/382.4 |
| 4,887,853 | 12/1989 | Flowers et al. | 285/382.4 X |

FOREIGN PATENT DOCUMENTS

| | | | |
|---|---|---|---|
| 2412697 | 10/1974 | Fed. Rep. of Germany | 285/382.5 |
| 455785 | 10/1950 | Italy | 285/382.4 |
| 470052 | 4/1953 | Italy | 285/382.5 |

*Primary Examiner*—Dave W. Arola
*Attorney, Agent, or Firm*—Finnegan, Henderson, Farabow, Garrett & Dunner

[57] ABSTRACT

This invention relates to a device for coupling lengths of metal pipe, too hard or to thin for cutting a screw, by inserting a screwed socket in one end of the pipe to be joined with another, expanding that part of the pipe, and joining it airtight with another coupling.

A metal pipe coupling of the present invention has a screw section and a tightening section, and is shaped so as to be suitable to the way of coupling metal pipes by insertion of one end of a metal pipe in the coupling, expanding the fastening section of the metal pipe so that the joining of the outside circumference of the pipe and the inside circumference of the coupling should be airtight, and thereafter by joining with another joining material.

6 Claims, 3 Drawing Sheets

METAL PIPE COUPLING

This application is a continuation-in-part, of application Ser. No. 07/777,126, filed Oct. 16, 1991, now abandoned.

BACKGROUND OF THE INVENTION

This invention relates to a metal pipe coupling, and to be more precise, to a device for coupling lengths of metal pipe, too hard or too thin for cutting a screw, by inserting a screwed socket in one end of the pipe, expanding that part of the pipe, and joining it airtight with another coupling.

In prior art, according to the most widely adopted method of coupling lengths of metal pipe, a screw is cut in the end of a pipe and is screwed up with another pipe in the end of which also a corresponding screw is cut. Otherwise, in case the inside diameter of the pipe is large enough, or in case the pipe is for use under high pressure for special purposes, coupling with the use of flanges or the like is adopted.

The most common joint materials for coupling metal pipes are nipples, angles, tees, crosses, unions, or reducers, and in all cases of joint pipes a screw meeting the one in the joining material has to be cut in the end of the pipe which is to be coupled with another.

But in case a pipe is of metal extremely hard or too thin coupling by ordinary, conventional methods proves very difficult.

It is practically impossible to cut a screw with the use of die stocks or the like in case the pipe is of too hard metal, and even if it is any possible the screw cutting will cost too much time and money, resulting in lower productivity, lower yield as a matter of course. In case the metal of the pipe is very thin, the screws, if cut at all despite the practical impossibility, will leave the thickness of the metal at the part where a screw is cut too thin for it to bear a slightest pressure.

SUMMARY OF THE INVENTION

Now the present invention is intended to provide a metal pipe coupling by which, overcoming the difficulties set out above, it becomes possible easily to join pipes, too thin or of too hard metal to admit a screw cutting, by fixing this new coupling in one of its ends and expanding it, making the joining airtight.

In accordance with this invention, a metal pipe coupling having a screw section and a tightening section is shaped in such particularity as to be suitable to the way of coupling metal pipes by insertion of one end of a metal pipe in the coupling, expanding the fastening section of the metal pipe so that the joining of the outside circumference of the pipe and the inside circumference of the coupling should be airtight, and thereafter by joining with another coupling.

DETAILED DESCRIPTION OF THE INVENTION

Below, some preferred embodiments of the present invention, attempted to attain the afore-said objective, are described making reference to the drawings attached hereto.

Figure 1:
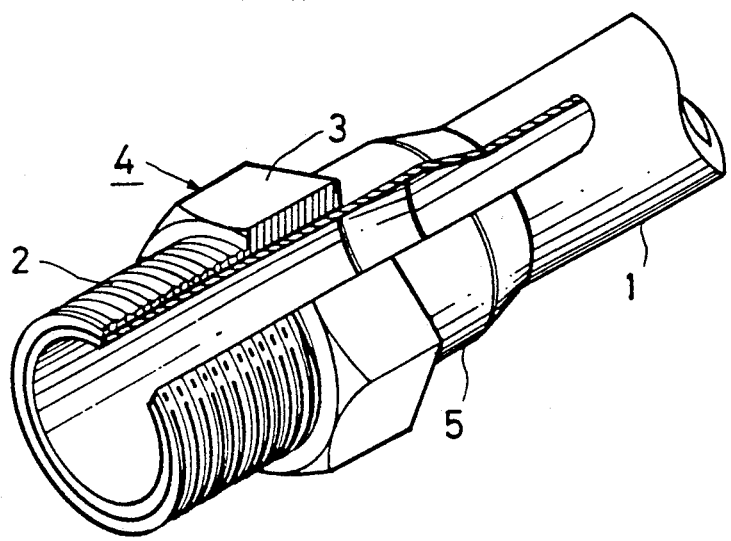
FIG. 1 is an exploded view of the main portion of a coupling according to the present invention.
Figure 2:
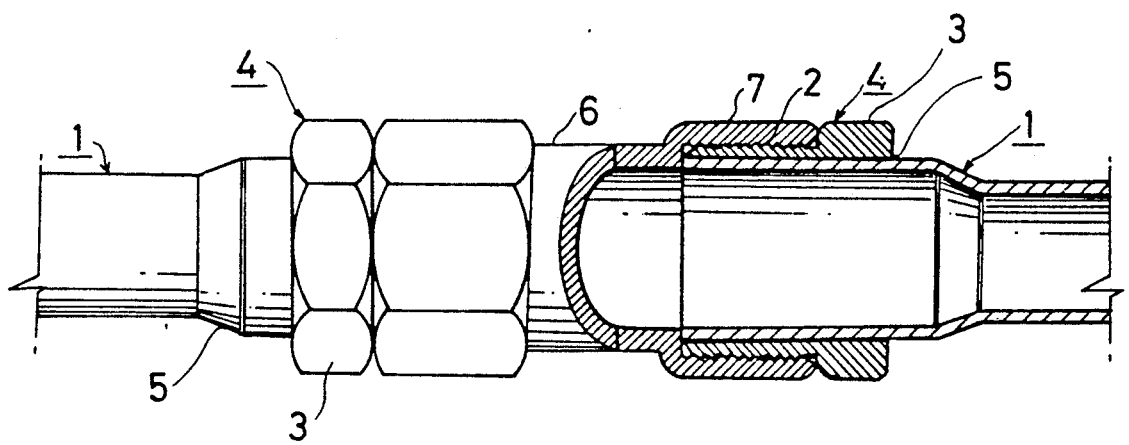
FIG. 2 is a partly cut-away top view of the coupling showing its usage.

The present invention, as is seen in FIGS. 1 and 2, is constituted of a coupling 4 with an inside diameter slightly larger than the outside diameter of the metal pipe to be joined with another and also with a screw section 2 and a tightening section 3, in which an end of the pipe 1 is inserted in the coupling 4 which is expanded thereafter to make the joining airtight.

Figure 3:
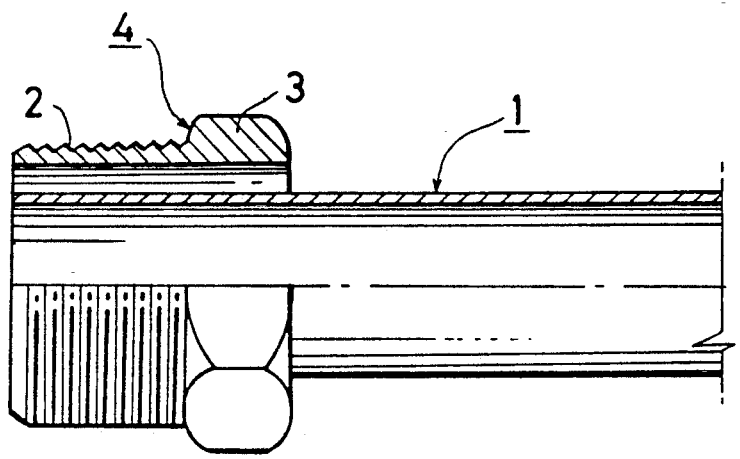
FIG. 3 is a partly cut-away front view of the coupling before its expansion.

To illustrate further, as is seen in FIG. 3, first you insert one end of the pipe 1, which has an outside circumference smaller than the inside circumference of the coupling, in the coupling 4, and then expand the entire inside circumference of the inserted pipe 1. The coupling 4 has a screw section 2 and a tightening section 3 shaped in advance, but a coupling 4 with all its outside formed in screw may also be used. The inside of this coupling 4 has to be of excellent roundness and in a straight line, so that the pipe 1 can secure perfect airtightness when the entire inserted end portion of pipe 1 is expanded. When further airtightness is requested in order to bear unusually high pressure or to contain gaseous material, it is possible to cut grooves inside the coupling 4 in the direction of the circumference and fit an elastic ring to it. It follows that the present invention, with a view to preventing the falling apart of the coupling 4 and the pipe 1 from each other at an external shock or shaking, can be embodied either by airtightening them in a way like biting of sawteeth by the grooves cut in the inside of the coupling 4 in the direction of the circumference and then expanding it, or by way of expanding the required end of the pipe 1 in a manner that the forward end of the fastening section 5 projected into the receiving end of the pipe 1 is in a shape a little expanded toward it.

As for the way of expanding the fastening section 5 of the pipe 1 it is done with the application of pressure of oil or air, or by the use of mechanical pipe expander, or else, needless to say, any of a variety of other methods can be made use of as circumstances allow.

Figure 4:
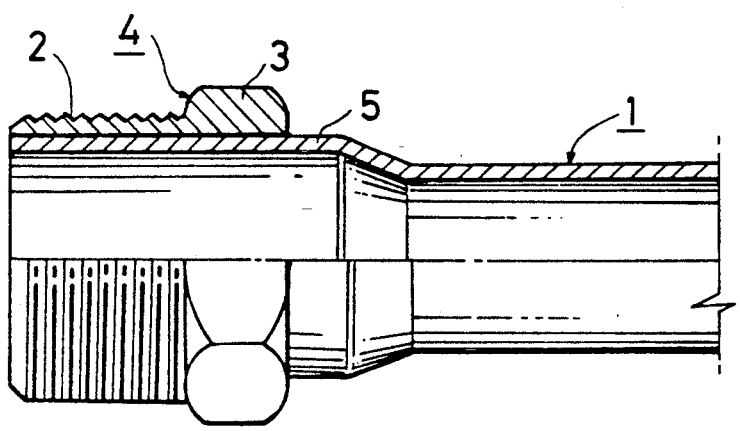
FIG. 4 is a partly cut-away front view of the coupling after its expansion.

FIG. 4 illustrates the state where the fastening section 5 of the pipe 1 has been expanded, and its entire inserted and expanded outside circumference and the inside circumference of the coupling 4 are joined airtight.

In the present invention it is also possible, when desired in practice, to lengthen the coupling in general to a desired length by joining fast, as is seen in FIG. 2, by driving the screw of the screw section 7 of the joining material 6 and that of the screw section 2 of the coupling 4, this latter being fastened on the outside of the pipe 1.

Figure 5:
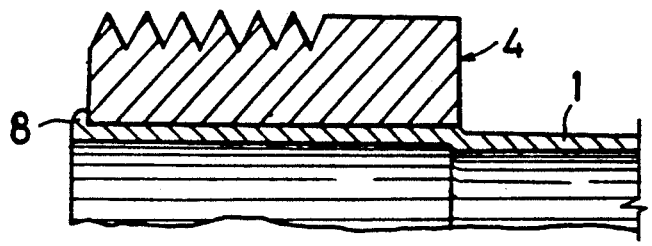
FIG. 5 to FIG. 8 represent sectional views of a few embodiments according to the present invention.
Figure 6:
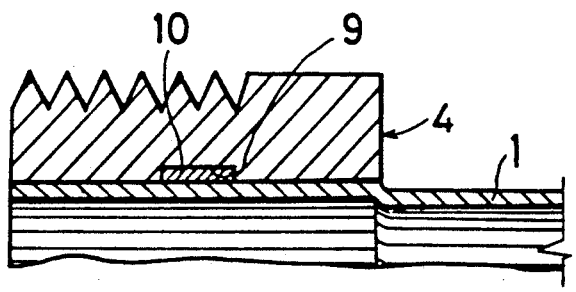
Figure 7:
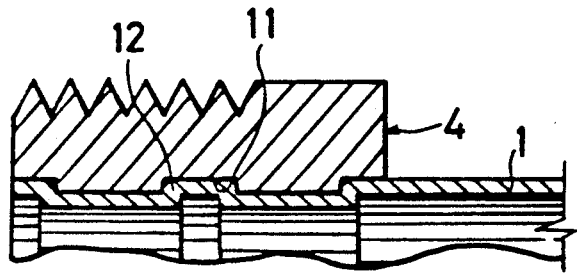
Figure 8:
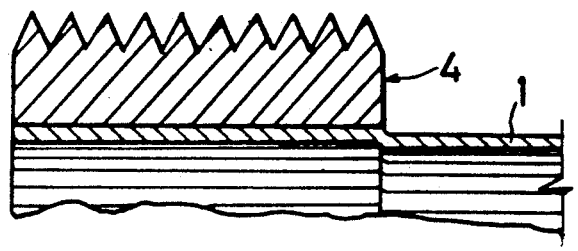

So far the description has been about coupling straight pipes in a straight line, but it goes without saying that the idea applies even to elbows, reducers, and other ways of coupling also. The way of shaping a ridge 8 (FIG. 5) by up-turning the end of the pipe 1 exposed through and past the coupling 4; the way of joining (FIG. 6) pipes 1 in a state in which at a part of the coupling 4 a circular packing seat 9 is formed and an elastic packing 10 is inserted; the way (FIG. 7) in which more circular grooves 11 than one are cut in the inside of the coupling 4 and the up-turned ridge 12 of the pipe 1 is formed by expanding the pipe against the inner surface of the coupling 4 including the circular grooves 11; the way (FIG. 8) of making the whole outside circumference of the coupling cut in screw; and other variations are all possible within the scope of the principal idea of the present invention.

The present invention of this structure will prove one very economical because it is applicable, by insertion of a coupling, to such pipes as are too thin and so normally inappropriate for cutting a screw in, and it will also prove advantageous in terms of productivity, improvement of yield rates, and economization of work hours because of its applicability to coupling pipes of material too hard, or inappropriate otherwise, to admit screw cutting in them for coupling purposes.

I claim:

1. A pipe assembly with a coupling, said assembly comprising:
   a hollow cylindrical body for receiving an end of a metal pipe, said hollow cylindrical body having an inner surface and an outer surface, said outer surface having a threaded region, said inner surface having at least one annular groove aligned perpendicular to the longitudinal axis of said hollow cylindrical body; and
   a metal pipe having an outer diameter slightly less than the inner diameter of said hollow cylindrical body, and an end portion inserted in said hollow cylindrical body, wherein said inserted end portion of said metal pipe is expanded in a radial direction so that the entire outer surface of said inserted end portion of said metal pipe is pressed against said inner surface of said hollow cylindrical body in an airtight manner.

2. The pipe assembly of claim 1, wherein said threaded region covers the entire outer surface of said hollow cylindrical body.

3. A method for coupling metal pipes, comprising the steps of:
   inserting a metal pipe having an outer surface of an outer diameter into a first hollow cylindrical body having an inner diameter slightly greater than the outer diameter of said metal pipe, said first hollow cylindrical body having an inner surface and a threaded outer surface;
   expanding the entire inserted portion of said metal pipe in a radial direction so that said entire outer surface of said inserted portion of said metal pipe is pressed against said inner surface of first hollow cylindrical body in an airtight manner; and
   mating a second hollow cylindrical body with said first hollow cylindrical body, said second hollow cylindrical body having an inner threaded surface and an inner diameter which is nearly equal to said outer diameter of said first hollow cylindrical body, said inner threaded surface of said second hollow cylindrical body mating with said threaded outer surface of said first hollow cylindrical body.

4. The method of coupling metal pipes of claim 3, wherein the step of expanding said metal pipe in its radial direction is carried out by fluid pressure means.

5. A pipe assembly with a coupling, said assembly comprising:
   a hollow cylindrical body for receiving an end of a metal pipe, said hollow cylindrical body having an inner surface and an outer surface, said outer surface having a threaded region;
   a metal pipe having an outer diameter slightly less than the inner diameter of said hollow cylindrical body, and an end portion inserted in said hollow cylindrical body, wherein said inserted end portion of said metal pipe is expanded in a radial direction so that the entire outer surface of said inserted end portion of said metal pipe is pressed against said inner surface of said hollow cylindrical body in an airtight manner.

6. A pipe assembly with a coupling, said assembly comprising:
   a hollow cylindrical body for receiving an end of a metal pipe, said hollow cylindrical body having an inner surface and an outer surface, said outer surface having a threaded region, said inner surface having at least one annular groove aligned perpendicular to the longitudinal axis of said hollow cylindrical body;
   at least one elastic ring embedded in said at least one annular groove on the inner surface of said hollow cylindrical body, the elastic ring having a surface substantially flush with the inner surface of the hollow cylindrical body; and
   a metal pipe having an end portion with an outer diameter slightly less than the inner diameter of said hollow cylindrical body, the end portion inserted in said hollow cylindrical body, wherein said inserted end portion of said metal pipe is expanded in a radial direction so that the entire outer surface of said inserted end portion of said metal pipe is pressed against said inner surface of said hollow cylindrical body and said surface of said elastic ring in an airtight manner.

* * * * *